United States Patent

Golding

[15] 3,658,651

[45] Apr. 25, 1972

[54] ION EXCHANGE TREATMENT OF BROMELAIN

[72] Inventor: David R. V. Golding, Kaneohe, Hawaii

[73] Assignee: Castle & Cooke Inc., Honolulu, Hawaii

[22] Filed: Apr. 28, 1970

[21] Appl. No.: 32,784

[52] U.S. Cl. .................................................. 195/66 R
[51] Int. Cl. ................................................. C07g 7/022
[58] Field of Search ................................... 195/62, 66

[56] References Cited

UNITED STATES PATENTS 3,475,277   10/1969   Heinicke ............................. 195/66 R Primary Examiner—Lionel M. Shapiro
Attorney—Cameron, Kerkam & Sutton

[57] ABSTRACT

Bromelain-containing juice extracted from pineapple plant stems is purified prior to precipitation of the enzyme by passing the juice in ion exchange relation with an anion exchanger in the bicarbonate form, a cation exchanger having weak acid functional groups in the $H^+$ or $NH_4^+$ form, and a second anion exchanger in the bicarbonate form.

5 Claims, No Drawings

ION EXCHANGE TREATMENT OF BROMELAIN

BACKGROUND OF THE INVENTION

This invention relates to the purification of bromelain-containing juice extracted from pineapple plant stems by known procedures comprising in general crushing the stems in roll presses followed by pressing the crushed mass to extract pineapple stem juice therefrom. Such methods are described, for example, in prior U.S. patents to Ralph M. Heinicke U.S. Pat. No. 3,002,981 granted Oct. 3, 1961 and U.S. Pat. No. 3,293,143 granted Dec. 20, 1966. As disclosed in these patents, the juice after having undergone suitable clarification by means of filtration, centrifugation or the like, and usually suitable pH adjustment, is diluted with acetone or other water soluble organic solvent such as those disclosed in the prior patent to Ralph M. Heinicke U.S. Pat. No. 3,475,277, whereby the solid enzymic material is recovered as a wet precipitate. It can then be dried if desired.

As disclosed in the aforesaid prior patents, pineapple stem juice contains undesirable contaminants which are difficult to remove and, if not removed, result in a dry product having a relatively high ash content and relatively low specific activity. In prior U.S. Pat. No. 3,475,277 it was proposed to subject the juice, prior to precipitation of the enzyme, to ion exchange treatment by passing it through a cation exchanger preferably in the ammonium form. The resulting dry product has greatly increased specific activity, as measured in terms of both GDU (Gelatin Digestion Units) and APU (Acid Phosphatase Units). The color of this improved product in neutral solution was not stable over a period of time, but the importance of reduced ash content and increased specific activity outweighed this disadvantage.

SUMMARY OF THE INVENTION

It has now been found that color stability of a neutral solution of the enzyme is important, not merely from the standpoint of appearance of the product, but also because discoloration is accompanied by a decrease of activity of the enzyme. The present invention provides a new ion exchange process producing a purified bromelain having not only the advantages of reduced ash and increased specific activity, but also good color stability in solution which in turn means stability of specific activity.

The exact technical and scientific reasons for the above relation between color stability and stability of activity are not completely understood. It is known that the juice extracted from pineapple stems, especially from *Ananas sativas* or *Ananas comosus*, contains certain substances which when oxidized form highly colored components. These colored substances are known to be derivatives of quinones, the predecessors of which are phenolic materials, and these derivatives may be capable of combining with the protease, i.e., bromelain, with the result of inactivation of the enzyme. For example, substituted phenols such as ferulic acid are known to be present.

Tests have shown that stability of the enzyme in solution correlates inversely with color rating. For example, the enzymic activity (GDU/gm) of a 1 percent aqueous solution of bromelain at pH 7, when measured as a function of time, varied inversely with the color of the solution as shown by the following results.

TABLE I

| Sample | Color pH 7 | GDU/gm Solid | | |
|---|---|---|---|---|
| | | 0 hr | 4.5 hr | 24 hr |
| A | 15 | 1,435 | 1,120 | 700 |
| B | 67 | 1,645 | 1,015 | 245 |
| C | 13 | 2,240 | 1,855 | 1,050 |
| D | 139 | 2,100 | 1,680 | 420 |

The color values can be determined by any suitable measurement known to the art. For example, a semi-empirical test which has been developed for use in specifying the quality of a sample of bromelain consists of measuring the color intensity which develops after a given period of time in an aqueous solution of bromelain adjusted to pH 7 and exposed to the air. The color can be measured in a Klett-Summerson colorimeter using a green (NO. 54) filter (500–560 m$\mu$). As indicated by the above results, the quality of the enzyme may be said to be proportional to the absorbance of the solution. Samples A and C, in which the absorbance was low, showed much greater retention of specific activity up to 24 hours than samples B and D in which the absorbance was relatively high.

According to the present invention, the stem juice, after suitable filtration and clarification and adjustment of pH as disclosed in the prior Heinicke U.S. Pat. No. 3,475,277, is then passed through three ion exchangers in series. The first ion exchanger is anionic in the bicarbonate form whereby anions in the stem juice are exchanged for bicarbonate ions. In the second exchanger, which is cationic, the bicarbonates in the juice from the first exchanger are neutralized to form carbonic acid which eventually decomposes to carbon dioxide and water. The cationic exchange resin is of the type having weak acid functional groups in the $H^+$ or $NH_4^+$ form. In the third exchanger, which is a second anionic unit in the bicarbonate form, further anion exchange takes place which absorbs some anions not absorbed in the first anionic unit, apparently because of the presence of the cations removed in the second unit.

The two anionic exchange resins have basic functional groups which usually are amines, either mixtures of primary, secondary and/or tertiary amines or all tertiary amine. Strong basic resins can also be used, provided that care is taken to convert them completely to the salt form (i.e., bicarbonate) to avoid exposing the juice to strongly basic groups. Examples are Duolite ion exchange resins A–101D (quaternary ammonium) and A–7 (primary, secondary, and tertiary amines), and Amberlite exchange resins IRA 68 and 93 (tertiary amine). The matrix can be any of the polymers commonly used for this purpose, the selection being based on considerations of cost and efficiency. Examples of known matrix resins are styrene-divinylbenzene, acrylic, methacrylic, phenolic and epoxy.

After being conditioned as recommended by the manufacturer, these anionic resins are converted to the free base from (e.g., by sodium hydroxide) and then to the bicarbonate form by treatment under pressure with excess water saturated with carbon dioxide, preferably under pressure in the range of 35 to 75 psig, and usually in the narrower range of 45–65 psig. These resins absorb some carbon dioxide at still lower pressures, but in order to insure near maximum absorption in the interest of exchange capacity and avoiding exposure of the juice to free basic groups, the use of pressure in the above ranges is desirable. The carbonation treatment can be accomplished by passing soda water through the column or by bubbling $CO_2$ directly through the column with the resin covered by water. Tests made with the anionic resins mentioned above show that they absorb $CO_2$ to substantially the same extent under the carbonation treatment, and that the absorption increases approximately linearly as the pressure increases.

The cationic resin usually comprises carboxylic acid functional groups, although phosphonic acid is also suitable, and the matrix is usually a cross-linked polymer of acrylic or methacrylic acid. The cross-linking agents can vary as shown in the art; many difunctional olefins will work. Examples of suitable cationic resins having the desired characteristics are Amberlite IRC–84, a cross-linked acrylic matrix having carboxylic functional groups, and Duolite ES–80.

For practical reasons, it is preferred to employ Amberlite IRA 68 in the first anionic exchanger and Amberlite IRA 93 in the second anionic exchanger, especially where the enzyme is being prepared for consumption as a food or drug. Amberlite IRA 68 has a high exchange capacity and for that reason is desirable, but it also has a measurable degradation rate so that it is desirable to follow it by Amberlite IRA 93 in the second anionic exchanger.

In using the system for juice purification, a pressure will normally be maintained equal to or somewhat greater than the carbonation pressure in order to suppress or to minimize the formation of bubbles in the column; for example, 75 psig gives good results in most cases. The pressurant may be either carbon dioxide or some inert gas such as nitrogen. When $CO_2$ is used, it tends to suppress loss of $CO_2$ from the resin, if any, but if present in excess, $CO_2$ can theoretically strip the impurities being absorbed by the column and thereby return them to the juice being purified.

The use of pressures of the order of 75 psig is not of critical importance, however. Good results are obtained at substantially less pressure, for example 40 psig. Moreover, although release of pressure might be expected to cause the resins to lose carbon dioxide, since they do not absorb carbon dioxide efficiently at such pressures, nevertheless reducing the pressure in the columns for short times, even down to atmospheric pressure, does not appear to affect performance adversely. This may be due to the fact that even at atmospheric pressure, loss of $CO_2$ from the resins probably occurs slowly.

For practical purposes therefore, an operating pressure range for the ion exchange treatment of the juice may be from 40 to 75–80 psig.

DESCRIPTION OF PREFERRED EMBODIMENTS

As already indicated, best results are obtained using the three ion exchange units referred to above in the bicarbonate, free acid and bicarbonate forms and under pressure. The following examples illustrate these results:

EXAMPLE I

A series of three stainless steel columns three inches in diameter each contained one liter of ion exchange resin. The first contained Amberlite IRA-68, the second Amberlite IRC-84, and the third Amberlite IRA-93. The anion resins IRA-68 and IRA-93 in the first and third columns were treated with sodium hydroxide and then rinsed until nearly neutral, after which aqueous carbon dioxide under 75 psig was passed through the resins until they were saturated as evidenced by the discharge of saturated carbonated water. Filtered pineapple stem juice containing dissolved bromelain (26 GDU/ml) was passed through the columns in the sequence IRA-68, IRC-84, IRA-93 under 75 psig nitrogen pressure. Samples were taken after the juice had passed through only the first two columns, IRA-68 and IRC-84, as well as after the third columns, IRA-68 and IRC-84, as well as after the third column IRA-93. The effluent was collected in one or two liter aliquots and the bromelain precipitated by adding an excess of acetone equal to 1.6 parts of acetone for one part of juice. The resulting precipitate was separated from the slurry, washed, dried and assayed with the results shown below. In addition, an aliquot of the original juice fed into the columns was precipitated with acetone without ion exchange treatment. The following results were obtained:

TABLE II

| Column from which sample was taken | Bed volumes | GDU/gm | Yield % | Color pH 7 | Ash % |
|---|---|---|---|---|---|
| None | – | 1,855 | 76 | 16 | 21.2 |
| IRA-93 | 1 | 2,590 | 38 | 13 | 0.6 |
| IRA-93 | 2 | 2,380 | 27 | 14 | 0.2 |
| IRA-93 | 4–6 | 2,590 | 39 | 15 | 0.6 |
| IRA-93 | 7–8 | 2,590 | 39 | 27 | 1.0 |
| IRA-93 | 9 | 2,555 | 66 | 139 | 1.0 |
| IRC-84 | 4–6 | 1,820 | 69 | 95 | 12.4 |
| IRC-84 | 7–8 | 1,820 | 69 | 96 | 15.0 |

It can be seen in the above table that the specific activity of the product was increased about 40 percent over that of the control and that the ash content was nearly eliminated for fractions which passed through all three columns (IRA-93). The fractions which passed only through the first two columns (IRC-84) were not enhanced in specific activity nor was the ash removed completely. This may have been because some of the ash-forming constituents were held in an anionic form which was absorbed on the last anion column only after some of the cationic species had been removed on the intermediate cation column.

It is also apparent in Table II that the color in solution at pH 7 of the effluent from the three columns is as good as or better than that of the control except for the last (seventh–ninth) bed volumes where exhaustion of the column with respect to the impurity responsible for color development began to become evident. In contrast, the effluent from the first two columns showed high color values characteristic of nearly all ion exchange bromelain previously obtained. For example, pineapple stem juice was passed through sulfonic acid cation exchange resins Duolite C-20 and Duolite C-25 in the ammonium form according to the procedure of U.S. Pat. No. 3,475,277, then precipitated with acetone and the product recovered and assayed in comparison with bromelain isolated from the same juice without ion exchange treatment. The results were as follows:

| Exchange Resin | GDU/gm | Color pH 7 | Ash % |
|---|---|---|---|
| None | 1,540 | 15 | 29.6 |
| C—20—NH$_4$ | 1,995 | 74 | 1.2 |
| C—25—NH$_4$ | 2,065 | 67 | 1.2 |

EXAMPLE II

Three columns, IRA-68, IRC-84, and IRA-93, were used as in Example I. An objective of this series of tests was to determine which functional capacity of the columns would be exhausted first, with respect to the three beneficial effects of ash removal, stable color in solution, and high specific activity. The results were as follows:

TABLE III

| Column from which sample was taken | Bed volumes | GDU/gm | Ash % | Color pH 7 |
|---|---|---|---|---|
| IRA-93 | 1–3 | 2,030 | 0.6 | 12 |
| IRA-93 | 4–6 | 2,415 | 0.2 | 13 |
| IRA-93 | 7 | 2,415 | 0.6 | 18 |
| IRA-93 | 8 | 2,380 | 1.0 | 23 |
| IRA-93 | 9 | 2,380 | 0.6 | 38 |
| IRA-93 | 10 | 2,380 | 0.8 | 30 |
| IRC-84 | 6 | 2,170 | 9.8 | 16 |
| Untreated control | | 1,680 | 26.8 | 8 |

As the above results show, the capacity to maintain a satisfactory level of color stability was exhausted first. However, this may have been due at least in part to the fact that equal volumes of each of the resins were used and the exchange capacity of the cation resin was almost twice that of the anion resins.

As in Example I, a sample (IRC-84) was withdrawn after the juice had passed through only the first two columns. Color was acceptable but ash removal was not complete.

EXAMPLE III

An alternative acceptable method for carrying out the process is to use anion columns in the bicarbonate form but a cation column in the ammonium form instead of the hydrogen form. In this way ammonium carbonate would be exchanged for the ash-forming constituents of stem juice. The following results were obtained:

TABLE IV

| Column from which sample was taken | Bed volumes | GDU/gm | Ash % | Color pH 7 | Na ppm |
|---|---|---|---|---|---|
| IRA-93 | 1-2 | 2,380 | 4.6 | 14 | |
| IRA-93 | 3 | 2,275 | 5.0 | 9 | |
| IRA-93 | 4 | 1,890 | 5.6 | 9 | |
| IRA-93 | 5 | 2,205 | 6.2 | 8 | 680 |
| IRC-84 | 6-7 | 2,310 | 2.0 | 60 | |
| IRC-84 | 8-9 | 2,310 | 0.8 | 25 | 368 |
| IRC-84 | 10-11 | 2,310 | 0.4 | 28 | |
| Untreated control | | 1,680 | 27.6 | 10 | |

Thus ash was reduced, specific activity increased and color stability was satisfactory. Properties of the samples removed after passing through only the first two columns (IRC-84) were marginally satisfactory with the exception of one sample (six to seven Bed Volumes). This may have resulted from channeling in the bed. The higher level of ash in the samples which passed through all three columns was attributed to the fact that the IRA-93 column had been regenerated with sodium hydroxide and that traces of sodium had been left in the resin.

The data in Examples I, II, and III demonstrate clearly the improvement obtained by using the third column (i.e., the second anion column IRA-93). The first anion column (IRA-68) is also necessary because the carboxyl resin in the second or cationic exchanger would not be expected to split salts of strong acids such as chlorides, sulfates, etc. This was confirmed by the following results:

EXAMPLE IV

Stem juice was passed through the cation column, IRC-84, and then through the last anion column, IRA-93, the first anion column, IRA-68, being omitted. Properties of the bromelain recovered from the stem juice were as follows:

TABLE V

| Bed Volumes | GDU/gm | Ash % | Color pH 7 |
|---|---|---|---|
| 1-2 | 1,505 | 29 | 31 |
| 3-5 | 1,610 | 30 | 58 |
| 6 | 1,470 | 31 | 57 |
| Untreated control | 1,750 | 32 | 9 |

It will be seen that the ash was not removed to any significant extent, and that both the color in solution and the protease activity were affected adversely.

It also appears that the system would not be expected to operate effectively if the anion columns comprised anions of strong acids instead of the weak carbonic acid. This is confirmed by the results shown below in Tables VI and VII. In Table VI, the first anion column contained Duolite A-7 in the chloride form and the second column contained Amberlite IRC-84 in the ammonium form, without further ion exchange treatment. In this case the following results were obtained:

TABLE VI

| Exchange resin | GDU/gm | Color pH 7 | Ash % |
|---|---|---|---|
| None | 840 | 25 | 36.4 |
| None | 875 | 25 | 37.0 |
| A-7 and IRC-84 | 1,680 | 101 | 0.4 |
| A-7 and IRC-84 | 1,575 | 103 | 0.6 |

As Table VI shows, there is a substantial increase in specific activity of the enzyme, and ash removal is satisfactory, but the color in solution was affected adversely and was unsatisfactory.

In a further series of experiments, three columns were used containing the resins IRA-68 in the chloride form, IRC-84 in the ammonium form and IRA-93 in the chloride form. The results are shown in the following table:

TABLE VII

| Column from which sample was taken | Bed volumes | GDU/gm | Ash % | Color pH 7 |
|---|---|---|---|---|
| IRA-93 | 1-2 | 2,310 | 0.2 | 107 |
| IRA-93 | 3 | 2,170 | 0.2 | 96 |
| IRA-93 | 4 | 2,240 | 0.2 | 117 |
| IRA-93 | 5 | 2,415 | 0.2 | 125 |
| IRC-84 | 5-6 | 2,345 | 0.6 | 125 |
| IRC-84 | 7-8 | 2,135 | 0.4 | 118 |
| IRC-84 | 7-10 | 2,275 | 0.4 | 122 |

These tests, which differed from those in Table IV in that the anionic columns were in the chloride form instead of the bicarbonate form, showed increase in specific activity and removal of ash which were both satisfactory (compare Example III), but the color values were entirely unacceptable in both the two-column and three-column tests, indicating that the enzyme would be unstable in storage over a period of time as stated above (See Table I).

Accordingly it will be seen that a process embodying the present invention produces bromelain having high specific activity and very low ash content, being equivalent in these respects to the process of the prior Heinicke U.S. Pat. No. 3,475,277. In addition, however, the process of the present invention produces greatly improved color stability in solution which is desirable not merely from the standpoint of appearance, but more importantly because increase in color stability in solution is accompanied by increase in stability of enzyme activity in solution.

I claim:

1. In the production of pineapple stem bromelain by precipitating the enzyme-containing material from juice expressed from crushed pineapple plant stems and purified by ion exchange treatment prior to precipitation, the improvement which comprises purifying the juice prior to precipitation by passing it in ion exchange relation first with an anionic exchange resin in the bicarbonate form, then with a cationic exchange resin having weak acid functional groups in the hydrogen or ammonium form, and then with an anionic exchange resin in the bicarbonate form.

2. The process defined in claim 1 wherein the ion exchange system through which the juice is passed is maintained under a pressure between about 35 and 75 psig.

3. The process defined in claim 1 wherein said anionic exchange resins comprise basic amino functional groups containing the bicarbonate anion.

4. The process defined in claim 1 wherein said anionic exchange resins comprise basic quaternary ammonium groups containing the bicarbonate anion.

5. In the production of pineapple stem bromelain by precipitating the enzyme-containing material from juice expressed from crushed pineapple plant stems and purified by ion exchange treatment prior to precipitation, the improvement which comprises purifying the juice prior to precipitation by passing it through an ion exchange system maintained under a pressure between 45 and 65 psig and including in series an anion exchanger containing an exchange resin having amino functional groups in the bicarbonate form, a second cation exchanger containing an exchange resin having carboxylic acid functional groups in the hydrogen form, and a third anion exchanger containing an exchange resin having amino functional groups in the bicarbonate form.

* * * * *

PO-1050
(5/69)

UNITED STATES PATENT OFFICE
CERTIFICATE OF CORRECTION

Patent No. 3,658,651                               Dated    April 25, 1972

Inventor(s)   Golding

It is certified that error appears in the above-identified patent and that said Letters Patent are hereby corrected as shown below:

Cover page, item [73], "Castle & Cooke Inc." should read --Castle & Cooke, Inc.--. Column 2, line 43, "from" should read --form--. Column 3, line 48, delete "columns, IRA-68 and IRC-84, as well as after the third".
Column 5, Table IV, the column headed "Bed volumes" should be spaced from the column headed "Column from which sample was taken", Signed and sealed this 12th day of September 1972.

(SEAL)
Attest:

EDWARD M. FLETCHER, JR.                ROBERT GOTTSCHALK
Attesting Officer                      Commissioner of Patents